United States Patent [19]

Yoshida

[11] Patent Number: 4,855,093
[45] Date of Patent: Aug. 8, 1989

[54] PROCESS OF MAKING A DIAPHRAGM OF CARBONACEOUS MATERIALS FOR A SPEAKER

[75] Inventor: Mitsuru Yoshida, Fujioka, Japan

[73] Assignee: Mitsubishi Pencil Co., Ltd., Tokyo, Japan

[21] Appl. No.: 157,980

[22] Filed: Feb. 19, 1988

[51] Int. Cl.$^4$ ............................ C01B 31/02; C08K 5/34
[52] U.S. Cl. .................................... 264/29.6; 264/211; 423/448; 423/449; 524/87; 524/92; 524/98; 524/495
[58] Field of Search .................... 264/29.1, 29.3, 29.6, 264/211; 423/445, 448, 449; 181/167; 524/86, 87, 92, 94, 98, 495, 496, 715

[56] References Cited

U.S. PATENT DOCUMENTS 3,171,816  3/1965  Peter et al. ..................... 264/29.1 X
4,343,376  8/1982  Tsukagoshi et al. ................. 181/167
4,755,337  7/1988  Takahashi et al. ................... 264/134

FOREIGN PATENT DOCUMENTS 56-168494  12/1981  Japan ................................ 181/167
59-30708   2/1984   Japan ................................ 423/449

OTHER PUBLICATIONS

The Merck Index (9th. ed. 1976) at pp. 1252 & CI-254.

Primary Examiner—Jeffery Thurlow
Assistant Examiner—Leo B. Tentoni
Attorney, Agent, or Firm—Oliff & Berridge

[57] ABSTRACT

A process for producing a diaphragm for a speaker of carbonaceous materials which includes the steps of mixing carbon powder in a binder mainly containing chlorine-containing vinyl resin to be carbonized after calcining, applying high shearing force to a mixture composition obtained by uniformly mixing and dispersing the resultant mixture to sufficiently knead the mixture, then preliminarily molding the resultant mixture in a sheet shape, molding the preliminarily molded sheet into a diaphragm, insolubilizing, infusibilizing the diaphragm and calcining the diaphragm in an inert atmosphere, wherein the mixture composition contains at least 0.1 to 5 percentage by weight of 1.8-diazobicyclo (5, 4, 0) undecene-7 or that in which its salt is chlorine-containing vinyl chloride. Thus, the process can simply and inexpensively produce a diaphragm having a high hardness, a high elasticity, a high strength, a light weight, an adequate internal loss, and thus less deformation by an external force, small distortion of sound, wide reproducing sound range, distinct sound quality and suitable for digital audio applications.

9 Claims, No Drawings

PROCESS OF MAKING A DIAPHRAGM OF CARBONACEOUS MATERIALS FOR A SPEAKER

BACKGROUND OF THE INVENTION

The present invention relates to a process for producing a diaphragm for a speaker of carbonaceous materials. More particularly, the invention relates to a process for producing a diaphragm for a speaker of carbonaceous materials having a high hardness, a high elasticity, a high strength, and a suitable internal loss as compared with a conventional diaphragm, and which exhibits less deformation by an external force than a conventional diaphragm, as well as a small sound distortion, wide sound reproduction range and distinct sound quality. The diaphragm is adapted for digital audio applications, and may be made by simple method.

It is generally desired to satisfy the following conditions for a speaker diaphragm:
(1) large propagating velocity of sound,
(2) adequately large internal loss of vibration,
(3) large rigidity rate,
(4) stable against variation in atmospheric conditions, no deformation nor change of properties, and
(5) industrially simple and inexpensive manufacturing process.

More specifically, the material for the diaphragm is required to reproduce sound in high-fidelity over a broad frequency band as a diaphragm. To efficiently and distinctly produce sound quality, the material should have high rigidity, a light weight, and no distortion such as creep against external stress. The conventional diaphragm materials include paper, plastic and metals. While paper and plastic have an adequately large internal loss, they exhibit a small propagating sound velocity and unstable variation when exposed to atmospheric conditions. While metals have a larger propagating sound velocity than paper and plastic, they suffer from the disadvantage of extremely small internal loss.

Recently, carbonaceous materials have been proposed as speaker diaphragm materials due to their light weight, high rigidity, an adequately large internal loss, and stability against variation in atmospheric conditions such as temperature and moisture. More specifically, plastics to be carbonized or plastics in which carbon powder is dispersed are formed in sheets, the sheets are molded into a diaphragm shape by utilizing its deformation by heating, carbonized and calcined. However, since these plastics may be readily thermally deformed even after having been molded into the diaphragm shape, it is necessary to insert such plastics in a mold having the same shape as the diaphragm before calcining so as to prevent such thermal deformation. However, these plastics inevitably shrink in size during the steps of insolubilizing, infusibilizing and calcining, and thus it is also necessary to prepare a plurality of approximate molds in shapes after molding to after carbonizing and removing the molded and carbonized products in the respective heat treating steps so as to obtain a diaphragm of designed size and shape, resulting in an extremely increased cost of the obtained diaphragm.

Chlorine-containing vinyl resins have excellent properties as plastics to be carbonized including compatibility with carbon powder, sheet formability, moldability into a diaphragm shape to be executed thereafter, and acoustic properties after carbonization. However, foaming of the chlorine-containing vinyl resin due to vigorous dehydrochlorination during the heat treating step, which is peculiar to chlorine-containing vinyl resin, is difficult to control, and such resins also suffer from thermal deformation. Therefore, a process for producing an excellent diaphragm for a speaker of carbonized binder mainly containing chlorine-containing vinyl resin has not yet been provided.

SUMMARY OF THE INVENTION

Accordingly, an object of the present invention is to provide a process for simply and inexpensively producing a diaphragm of carbonaceous materials having a high hardness, a high elasticity, a high strength, a light weight, an adequately large internal loss, and thus less deformation by an external force, small distortion of sound, wide sound reproduction range, a distinct sound quality and which are adapted for digital audio applications by the use of chlorine-containing vinyl resin mainly containing binder to be carbonized after calcining.

The inventor has undertaken a study to perform the above-described object, and has thus completed his invention by developing a process for producing a diaphragm for a speaker of carbonaceous materials comprising the steps of mixing carbon powder in a binder mainly containing chlorine-containing vinyl resin to be carbonized after calcining, applying high shearing force to a mixture composition obtained by uniformly mixing and dispersing the resultant mixture to sufficiently knead the mixture, then preliminarily molding the resultant mixture into a sheet shape, molding the preliminarily molded sheet into a diaphragm shape, insolubilizing, infusibilizing the diaphragm and calcining the diaphragm in an inert atmosphere, wherein the mixture composition contains at least 0.1 to 5 percentage by weight of 1,8-diazobicyclo (5, 4, 0) undecene-7 or a chlorine-containing vinyl chloride salt thereof.

An embodiment of a process for producing a diaphragm for a speaker of carbonaceous materials according to the present invention is described in detail below.

1,8-diazobicyclo (5, 4, 0) undecene-7 (hereinafter referred to as "DBU") or its salt has a structure:

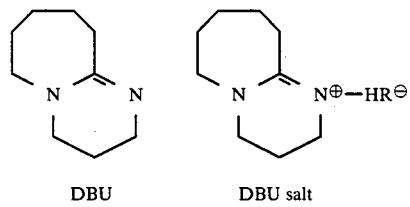

DBU      DBU salt

DBU is a monoacidic strong base which can form a salt with various types of acids to produce an equivalent salt by adding one equivalent to acid. DBU or its salt can extract active hydrogen under very moderate conditions when the DBU or its salt is added to the chlorine-containing vinyl resin and the mixture is heated. Under such conditions, a dehydrochlorination reaction slowly occurs in the chlorine-containing vinyl resin so that a large quantity of conjugated double bonds are generated in the chlorine-containing vinyl resin, and a crosslinking reaction simultaneously occurs as a competitive reaction, with the result that the chlorine-containing vinyl resin possesses a polyethylene structure. These reactions are pH-sensitive, and are proceeded as the alkalinity is increased. Therefore, in the case of the salt of DBU, the strong base is weakened (is less reactive), but on the other hand, DBU is somewhat toxic against the human body. More particularly, the carboxylate has almost no toxicity. Thus, DBU or its salt may be preferably used according to the particular requirements.

In the present invention, it is preferable, in view of the degree of freedom of moldability and the shape stability of the molded product, to react the vinyl chloride resin with DBU or its salt during the molding of a diaphragm shape after sheet forming. Alternatively, the reaction can take place during heat treating the green molding, which can be easily performed by the most simple process of insolubilizing and infusibilizing the green molding in a heated oven. More preferably, most of chlorine-containing vinyl resin is reacted with DBU or its salt to be polychlorinated during molding, thereby completing the polychlorination during the subsequent insolubilizing and infusibilizing steps, and thereby suppressing deformation during calcining of the product. Further, a secondary improvement capable of omitting the insolubilizing and infusibilizing steps necessary when obtaining an ordinary carbon product is obtained according to the degree of polychlorination at time of molding.

The addition ratio of DBU or its salt to the mixture composition depends upon the basicity of DBU or its salt to be used, and the properties of the product to be produced. The DBU (or its salt) concentration is 0.1 to 5 percent, preferably 0.5 to 3 percent, of the chlorine-containing vinyl resin.

The chlorine-containing vinyl resin may be selected from a group including vinyl chloride resin, chlorinated vinyl chloride resin, and vinylidene chloride resin. One or more types of chlorinated vinyl chloride resin having 60 to 70 percent by weight of chlorine content produced by a postchlorination method of vinyl chloride resin having a degree of polymerization of 500 to 1500 is preferred due to its preferable acoustic properties, sheet forming and moldability.

Carbon fine powders which may be used in the present invention include artificial graphite, natural flaky graphite, carbon black, cokes, or carbon fiber. Preferable results can be provided by using one or more types of fine powders of artificial graphite and natural flaky graphite having a mean grain size of 20 microns or less, preferably 10 microns or less.

In the present invention, for the purposes of improving the kneading and/or sheet forming, molding properties by adding a high shearing force, one or more types of plasticizer or solvent such as DOP, DBP, TCP, DOA, DOS, DAP, propylene carbonate, N-methylpyrrolidone, and/or one or more types of molding assistant such as chlorinated polyolefin, ethylene-vinyl acetate copolymer, ethylene, acrylic copolymer, metallic soap, fatty soap, natural wax and petroleum wax may be added in extremely small amount to the mixture composition as required. However, it is preferable not to add a stabilizer of the chlorine-containing vinyl resin due to the properties of the dehydrochlorination and crosslinking reactions. Further, one or more types of pitches phase soluble with the chlorine-containing vinyl resin, chlorinated rubber, natural resin, thermoplastic resin or thermoset resin (except chlorine-containing vinyl resin) may be added in small amount to part of a binder to be carbonized after calcining as a carbonization adjustor to adjust the quality of the product to be produced.

A process for producing a diaphragm for a speaker of carbonaceous materials with the materials described above according to the present invention will now be described.

First, 30 to 70 parts by weight of chlorine-containing vinyl chloride, 20 to 70 parts by weight of carbon fine powder, 0 to 40 parts by weight of plasticizer or solvent to be added as required, 0 to 10 parts by weight of molding assistant, 0 to 10 parts by weight of carbonization adjustor, and 0.03 to 3.5 parts by weight of DBU or its salt are weighed, and uniformly mixed and dispersed in a high speed mixing machine, such as a Henschel mixer. The resultant mixture is kneaded by applying high shearing force, and a kneaded material having thermal plasticity to be formed in a sheet physicochemically bonded on the surfaces of fine carbon powder by binder carbonized after calcining as a result of mechanochemical reaction produced by mechanical energy is obtained. The kneading machine for applying the high shearing force may be a 2-roll machine, a 3-roll machine, a pressurizing kneader, a Banbury mixer or a biaxial screw extruder. The chlorine-containing vinyl resin may be heated to a degree that a vigorous dechlorination reaction does not occur in abrupt reaction with the DBU or its salt due to overheating of the chlorine-containing vinyl resin during kneading. Further, two or more types of kneading machines may be continuously used.

Then, the kneaded materials are formed into a sheet of uniform thickness in an extrusion molding machine in which rolls and a T-shaped die are disposed at the end.

The sheet is then disposed in a mold which has read a shrinkage after carbonization in a diaphragm shape to be produce. The sheet is molded into a desired diaphragm shape by a vacuum molding method, a compression molding method or a blow molding method which are known per se. The mold is heated to 100° C. or higher, more preferably to 150° C. or higher, so that the chlorine-containing vinyl resin reacts with the DBU or its salt during molding. The chlorine-containing vinyl resin is then polychlorinated, and then removed from the mold to provide a green molding. When a plasticizer or a solvent is added to the mixture composition, most of this may be preferably evaporated at this time.

Then, the green molding is insolubilized and infusibilized as required. The insolubilizing and infusibilizing process ordinarily includes, in case of producing an ordinary carbon material, a method comprising heating to 150° to 400° C. in an oxidative atmosphere such as air or ozone, a method comprising heat treating at 50° to 400° C. in a corrosive gas atmosphere such as ammonia gas or chlorine gas, and a method comprising irradiating with radioactive ray. In this invention, the insolubilizing and infusibilizing process is not particularly limited, but the purpose can be sufficiently achieved by heat treatment in air. The finishing end of the insolubilizing and infusibilizing process employs the point that the chlorine-containing vinyl resin reacts with the DBU or its salt, the polychloride structure by dechlorination reaction and subsequent crosslinking reaction is employed to lose its thermoplasticity and to exhibit thermosetting property as the entire molding. When the reaction is completed during the molding step, the insolubilizing and infusibilizing process can be omitted as described above.

The molding produced and treated as described above is then gradually heated from room temperature in an inert atmosphere such as nitrogen or argon gas to 700° C. or higher and more preferably 1000° C. or higher to be carbonized, then cooled, and removed as a product.

DESCRIPTION OF THE PREFERRED EMBODIMENTS

The present invention will be described by examples of process for producing a diaphragm for a speaker of fully carbonaceous materials, but the present invention is not limited to the particular examples.

EXAMPLE 1

A composition having 50 parts by weight of chlorinated vinyl chloride resin having 65 wt.% of chlorination degree (Nikatemp T-742 produced by Nippon Carbide Kogyo K.K., Japan), 50 parts by weight of natural flaky graphite powder (CSP produced by Nippon Graphite Kogyo K. K., Japan) 0.5 part by weight of DBU oleic acid, 1 part by weight of stearic acid amide and 10 parts by weight DBP was sufficiently mixed and dispersed in a Henschel mixer, kneaded in a pressure kneader at 70° C. for 40 minutes, and then further kneaded by three rolls held at 80° C. on the surfaces of the rolls for 40 minutes. Then, the kneaded material was removed, and preliminarily molded into a sheet having a thickness of 150 microns by milling rolls. Thereafter, the sheet was molded into a dome shape having 36 mm of diameter in a vaccum molding machine. The molding conditions include preheating the mold to 150° C., evacuating in vacuum the sheet, then heating the molding to 200° C. after 10 minutes to volatilize the DBP during the heating step, and to react the DBU oleate with the chlorinated vinyl chloride resin. The polychlorinated molding was removed from the mold, introduced into a heating oven at 200° C., heated to 240° C. for 6 hours to perform the insolubilizing and infusibilizing steps. Thereafter, the molding was carbonized by heating from room temperature to 300° C. at a temperature rising rate of 10° C./hour and then from 300° C. to 1000° C. at a temperature rising rate of 30° C./hour in nitrogen atmosphere, then cooled and the product was removed.

The thus obtained diaphragm for a speaker of fully carbonaceous materials accurately maintained a dome shape having a thickness of 90 microns and 35 mm of diameter, and exhibited the characteristics of 1.65 of specific weight, 280 GPa of Young's modulus, 13 km/sec. of sound velocity and 0.01 of internal loss.

EXAMPLE 2

A molded sheet produced under the same conditions as those in Example 1 was molded under the same molding conditions as those in Example 1 except that the heating time ws 20 min. and the arriving temperature was 240° C. to complete the polychlorination reaction, thereby obtaining the molding. The molding was then heated to 1000° C. to be carbonized under the same conditions as those in Example 1 except that the insolubilizing and infusibilizing steps were omitted, then cooled and the product was then removed.

The diaphragm thus obtained for a speaker of carbonaceous materials accurately maintained a dome shape having a thickness of 90 microns and 35 mm of diameter, and exhibited the characteristics of 1.65 of specific weight, 260 GPa of Young's modulus and 12.6 km/sec. of sound velocity and 0.01 of internal loss.

COMPARISON EXAMPLE

The same mixture composition as that of Example 1, except the DBU oleate was omitted, was molded under the same conditions as those in Example 1. Then, an abrupt decomposition reaction of the chlorinated vinyl chloride resin occurred when the temperature exceeded 180° C., and the surface of the dome was foamed.

Then, the molding conditions were altered from those in the Example 1, i.e., the arriving temperature was lowered to 170° C. of the degree that the surface of the dome did not foam, further maintained that 170° C. for 10 min to volatilize most of the DBP, and removed from the mold to obtain the molding. Then, for the purpose of preventing the molding from foaming at calcining time, the molding was heated from room temperature to 180° C. in 10 hours in a heating oven and held at 180° C. for 20 hours to perform the insolubilizing and infusibilizing steps. Thereafter, both the moldings, one of which was not insolubilized nor infusibilized after molding, and the other of which was insolubilized and infusibilized, were calcined under the same conditions as those in the Example 1, cooled and the product was then removed.

However, the product in which the insolubilizing and infusibilizing steps were omitted was foamed on the surface of the dome and remarkably deformed in an elliptical shape. The product in which the insolubilizing and infusibilizing steps were carried out maintained its dome shape after the insolubilizing and infusibilizing steps, and did not exhibit foaming phenomenon on the surface of the dome, but was deformed into an elliptical shape unsuitable for use as a diaphragm for a speaker after carbonization.

As illustrated in the Examples described above, the process according to the present invention provides a diaphragm for a speaker of carbonaceous materials to be produced by mainly containing the chlorine-containing vinyl resin as a binder to be carbonized after calcining which was extremely difficult in the conventional process. The diaphragm obtained according to the process of the present invention has excellent properties as the diaphragm including high hardness, high elasticity, high strength, light weight, less deformation by external force due to adequate internal loss, small distortion of sound, a wide sound reproduction range, and a distinct sound quality and is suitable for digital audio applications. In addition, the process according to the invention is simple, and advantageous for inexpensively producing a diaphragm having the excellent properties described above.

What is claimed is:

1. A process for producing a diaphragm for a speaker, comprising the steps of:
    mixing carbon powder in a binder mainly containing chlorine-containing vinyl resin to form a mixture composition,
    applying high shearing force to said mixture composition to sufficiently knead the mixture,
    then preliminarily molding the resultant mixture into a sheet shape;
    molding the preliminarily molded sheet into a diaphragm,
    insolubilizing, infusibilizing the diaphragm and calcining the diaphragm in an inert atmosphere,
    wherein said mixture composition contains at least 0.1 to 5 percent by weight of a material selected from the group consisting of 1,8-diazobicyclo (5, 4, 0)

undecene-7 and a chlorine-containing vinyl chloride salt thereof.

2. The process according to claim 1, wherein said mixture contains a salt of 1,8-diazobicyclo (5, 4, 0) undecene-7.

3. The process according to claim 1, wherein said chlorinecontaining vinyl resin is selected from a group consisting of vinyl chloride resin, chlorinated vinyl chloride resin and, vinylidene chloride resin.

4. The process according to claim 3, wherein said chlorinecontaining vinyl resin is at least one type of the chlorinated vinyl chloride resin including 60 to 70 percentage by weight of chlorine content produced by postchlorinating vinyl chloride resin having a degree of polymerization of from 500 to 1500.

5. The process according to claim 1, wherein said carbon powder is selected from a group consisting of artificial graphite, natural flaky graphite, carbon black, cokes, and carbon fiber.

6. The process according to claim 1, wherein at least one type of molding assistant is selected from a group consisting of chlorinated polyolefin, ethylene-vinyl acetate copolymer, ethylene, acrylic copolymer, metallic soap, fatty soap, natural wax and petroleum wax.

7. The process according to claim 1, wherein at least one type of pitch which is phase soluble with the chlorine-containing vinyl resin capable of acting as a carbonization adjustor and selected from the group consisting of chlorinated rubber, natural resin, thermoplastic resin and thermoset resin is added to part of said binder after calcining.

8. The process of claim 5 wherein said carbon powder has a mean grain size of 20 microns or less, and is selected from the group consisting of artificial graphite and natural flaky graphite.

9. The process of claim 1 wherein said composition includes a plasticizer or solvent selected from the group consisting of DOP, DBP, TCP, DOA, DOS, DAP, propylene carbonate, and N-methylpyrrolidone.

* * * * *